United States Patent [19]

Franke

[11] 4,286,686
[45] Sep. 1, 1981

[54] MULTI-PLATE FRICTION CLUTCH

[76] Inventor: Rudolf Franke, Martinstrasse 31, D-6100 Darmstadt, Fed. Rep. of Germany

[21] Appl. No.: 9,717

[22] Filed: Feb. 5, 1979

[30] Foreign Application Priority Data

Feb. 10, 1978 [DE] Fed. Rep. of Germany ....... 2805692
May 11, 1978 [DE] Fed. Rep. of Germany ....... 2820582

[51] Int. Cl.$^3$ .................... B60K 23/08; F16D 25/00
[52] U.S. Cl. .................................. 180/233; 180/248; 192/85 AA
[58] Field of Search ............... 180/248, 247, 234, 233; 192/85 AA, 56 F, 82 R

[56] References Cited

U.S. PATENT DOCUMENTS

| 3,403,763 | 10/1968 | Hilpert et al. | 192/85 AA |
| 3,420,344 | 1/1969 | Hilpert et al. | 192/85 AA |
| 3,482,669 | 12/1969 | Foster-Pegg | 192/85 AA |
| 3,923,133 | 12/1975 | Chivari | 192/85 AA |

Primary Examiner—Henry Jaudon
Attorney, Agent, or Firm—James C. Wray

[57] ABSTRACT

A multi-plate friction clutch for a motor vehicle to automatically engage normally driven wheels with wheels which are not normally driven includes a fluid pressure piston/cylinder for engaging the plates connected to a pressure line and a discharge line through two rotary valves. One valve is formed by an inner plate carrier rotatable on a drive shaft through an angle $\alpha$ and the other valve is formed by a sleeve around the shaft and rotatable with respect to a fixed housing through an angle $\beta$. The cylinder is selectively pressurized or depressurized through bores, ducts, ports and line systems in dependence or the relative rotary movements of the valves.

An over-ride valve is provided.

15 Claims, 12 Drawing Figures

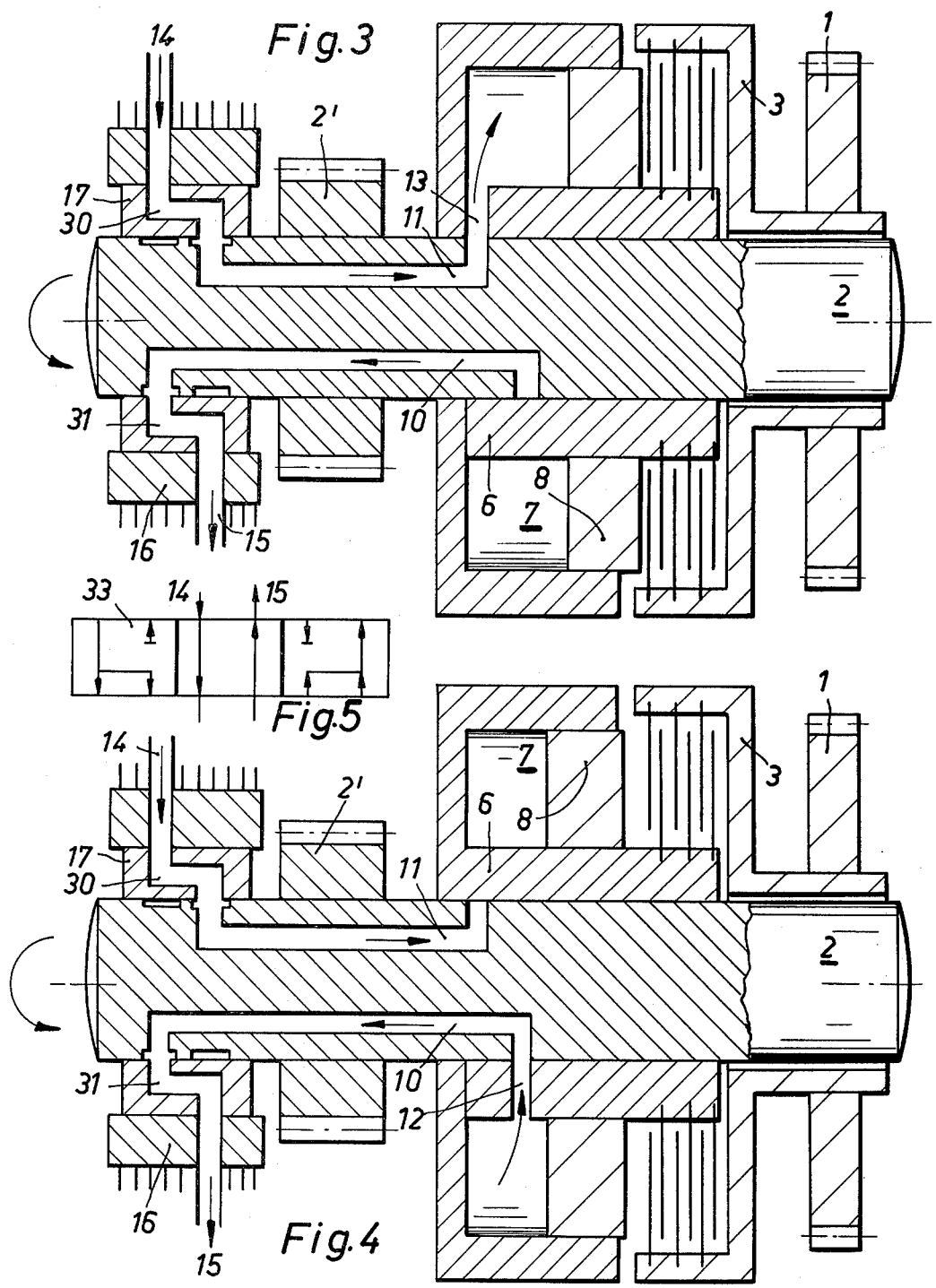

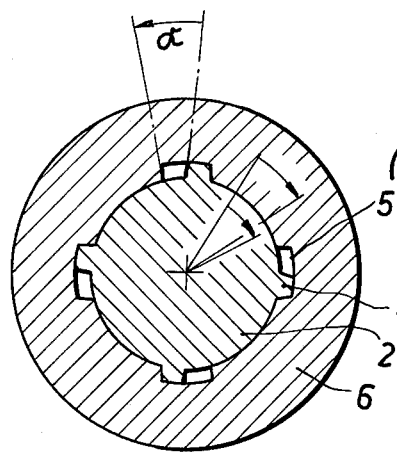
Fig. 7 (A-A)
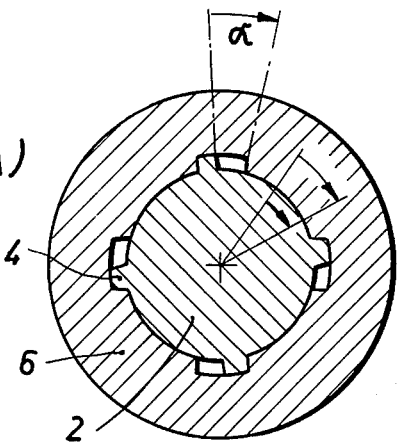
Fig. 8
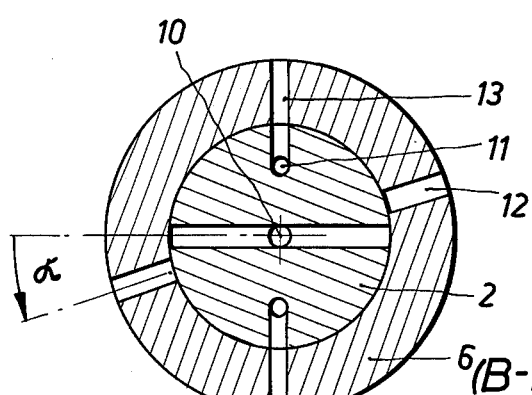
Fig. 9 (B-B)
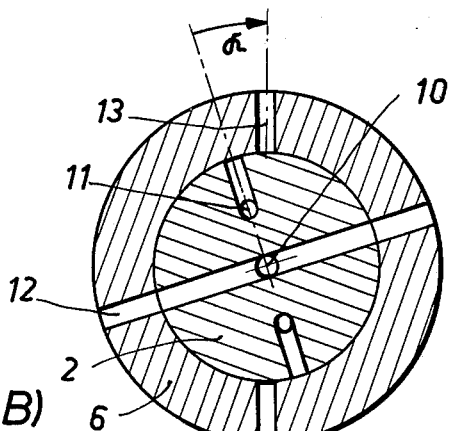
Fig. 10
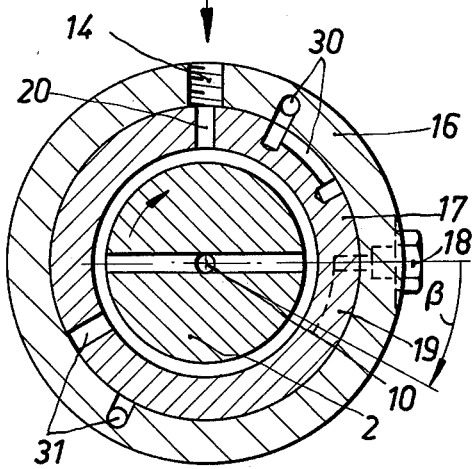
Fig. 11 (C-C)
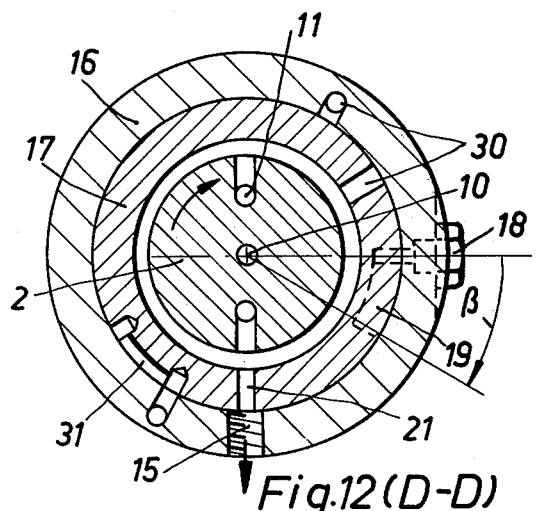
Fig. 12 (D-D)

MULTI-PLATE FRICTION CLUTCH

BACKGROUND OF THE INVENTION

The invention relates to a multi-plate friction clutch which is actuated by a pressure medium, for example oil pressure, having an inner plate carrier and an outer plate carrier, for motor vehicles.

Multi-plate friction clutches of this kind are known in many different forms and for a wide range of uses. In most forms, the controllable pressure medium engages the multi-plate friction clutch against the effect of a mechanical spring force, while in other forms the controllable pressure medium disengages the clutch, for safety reasons.

There has been proposed multi-plate friction clutch, together with the associate control means, which while being of relatively low additional cost, affords the possibility, in dependence on slip of the normally driven wheels relative to the wheels which are not normally driven, for the drive means thereof to be cut in automatically in such a way that either only the normally driven wheels or the normally driven wheels and in addition the wheels which are not driven normally are coupled to the drive engine.

The additional free-wheel clutches which were previously proposed for this purpose require a considerable degree of additional cost and have not proved fully successful in practice, because they must be locked for reverse movement, by a further additional means, which requires further handles or attention on the part of the driver, which should no longer be necessary by virtue of a reliable automatic mechanism.

SUMMARY OF THE INVENTION

In apparatus of the kind set out above, according to the invention the hub of the inner plate carrier is arranged swivel-mounted through a control angle $\alpha$ on the shaft and is formed as a rotary slide valve in such a way that, in one position of the hub of the inner plate carrier, the cylinder of the hydraulic actuating means of the clutch is in communication by way of a pressure medium line with an outer pressure medium feed line, and, in the other position of the hub of the inner plate carrier, the cylinder is in communication with an outer pressure medium discharged and the pressure medium line is closed.

A preferred embodiment is characterised in that either the inner plate carrier or the outer plate carrier is coupled to the wheels which are continuously driven when the vehicle is moving, and the other plate carrier is coupled to the wheels which are not normally driven when the vehicle is moving, for example the front wheels of an agricultural-use motor vehicle, and that, when a predetermined angle $\alpha$ of rotation between the inner plate carrier and the shaft is reached, the inner plate carrier becomes operative as a rotary slide valve, relative to the shaft, the rotary slide valve cutting in the clutch and thereby coupling the wheels which are not normally driven when the vehicle is moving, to the wheels which are normally driven.

It has been found to be particularly desirable if a sleeve which is rotatable relative to the clutch housing within a predetermined control angle $\beta$ is carried with slight friction on the shaft on which the hub of the inner plate carrier is swivel-mounted arranged, the sleeve being formed as a second rotary slide valve relative to the housing, and, in one direction of rotation of the shaft, for example that in which the normally driven wheels are at the front in the direction of rotation, the sleeve communicates the outer pressure medium feed line only to the other pressure medium line to the first rotary slide valve, which other pressure medium line extends within the shaft, and at the same time communicates the outer pressure medium discharge line only with the one pressure medium line to the first rotary slide valve, which on pressure medium line extends within the shaft.

This arrangement achieves the particular advantage that the freewheel action is maintained both when the vehicle provided with the multi-plate friction clutch is moving forward and when the vehicle is moving backwards, the freewheel action thus being maintained for both directions of rotation of the shaft. Therefore, irrespective of whether the normally driven wheels of the vehicle are at the front or at the rear in the direction of movement thereof, the arrangement of the invention provides a freewheel action with the advantages which result therefrom in practical use, both for forward travel and also for reverse travel.

It is advantageous for the sleeve which operates as a second rotary slide valve to include two different line systems which are displayed relative to each other through a control angle $\beta$ in the direction of the periphery of the sleeve, in such a way that in one control position thereof, the outer pressure medium feed line is communicated by way of the line of the first line system with the first pressure medium line which extends in the shaft, and the outer pressure medium discharge line is communicated by way of the line of the first line system with the second medium pressure line which extends in the shaft, whereas in the other control position thereof, the outer pressure medium feed line is communicated by way of the line of the second line system with the second pressure medium line which extends in the shaft, and the outer pressure medium discharge line is communicated by way of the line of the first line system with the first pressure medium line which extends in the shaft.

BRIEF DESCRIPTION OF THE DRAWINGS

The invention will now be further described, by way of example, with reference to the accompanying drawings, in which corresponding components are denoted throughout by the same reference numerlas, and in which:

FIG. 3 shows the principle of a multi-plate friction clutch according to FIG. 1 in the other direction of rotation indicated by the arrow, in the position for 'clutch engaged';

FIG. 4 shows the multi-plate friction clutch of FIG. 2 in the other direction of rotation indicated by the arrow, in the position for 'clutch disengaged' by virtue of a lead of the wheels, which are not continuously driven;

FIG. 5 shows a circuit diagram for the auxiliary means for selectively over-riding the freewheel action;

FIG. 7 shows a view in cross-section taken along line A—A in FIG. 6 in the 'clutch disengaged' control position, produced by the front wheels and the clutch shaft leading;

FIG. 8 shows a view in cross-section taken along line A—A in FIG. 6 in the 'clutch engaged' control position, produced by the greater degree of slip of the normally driven wheels and the resulting relative movement of the hub of the inner plate carrier relative to the shaft;

FIG. 9 shows a view in cross-section taken along line B—B in FIG. 6 through the control bores of the rotary slide valve in the 'clutch disengaged' control position corresponding to FIG. 7;

FIG. 10 shows a view in cross-section taken along line B—B in FIG. 6 through the control bores of the rotary slide valve in the 'clutch engaged' control position corresponding to FIG. 8;

FIG. 11 shows a view in cross-section taken along line C—C in FIG. 6 through the control bores of the second rotary slide valve in 'forward travel', the outer pressure oil feed line being connected to a pressure oil line in the shaft;

FIG. 12 shows a view in cross-section taken along line D—D in FIG. 6 in 'forward travel', the outer pressure oil discharge line being communicated with the other pressure oil lines in the shaft, from those in FIG. 11.

DESCRIPTION OF THE PREFERRED EMBODIMENTS

In the multi-plate friction clutch shown in a simplified and diagrammatic form in FIGS. 1 to 4, the gear wheel 1 engages with a gear wheel (not shown) of the motor vehicle transmission, which is driven proportionally to the speed of rotation of the main drive shaft. Gear wheel 1 is mounted rotatably on the shaft 2 and is fixedly connected to the outer plate carrier 3 of the multi-plate friction clutch.

Figure 2:
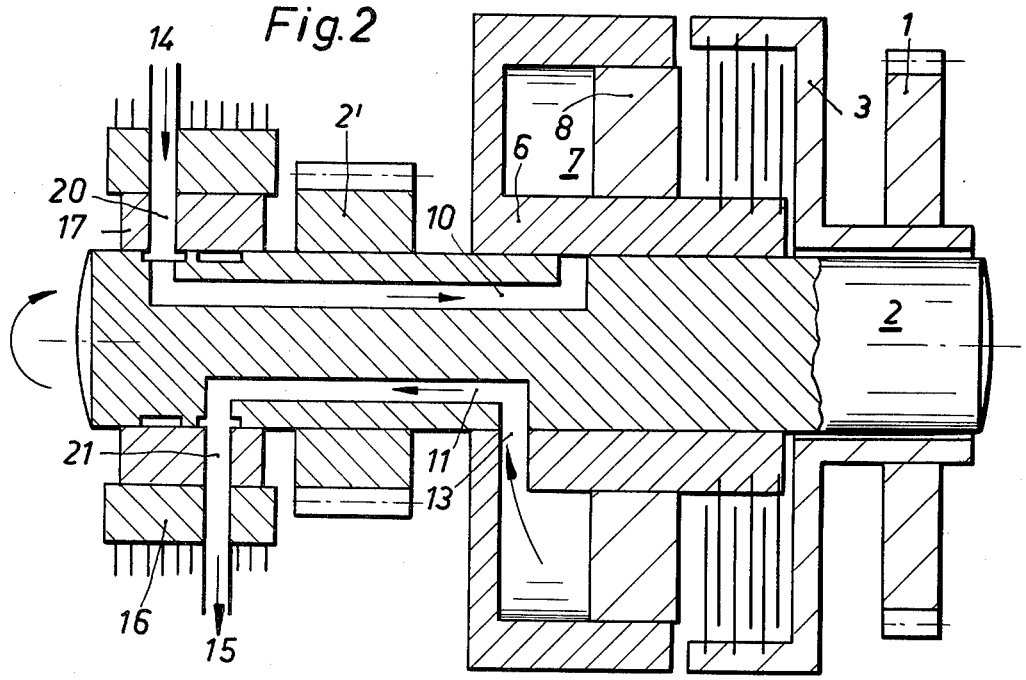
FIG. 2 shows the multi-plate friction clutch according to FIG. 1 in the position for 'clutch disengaged', by virtue of a lead of the wheels which are not normally driven.
Figure 6:
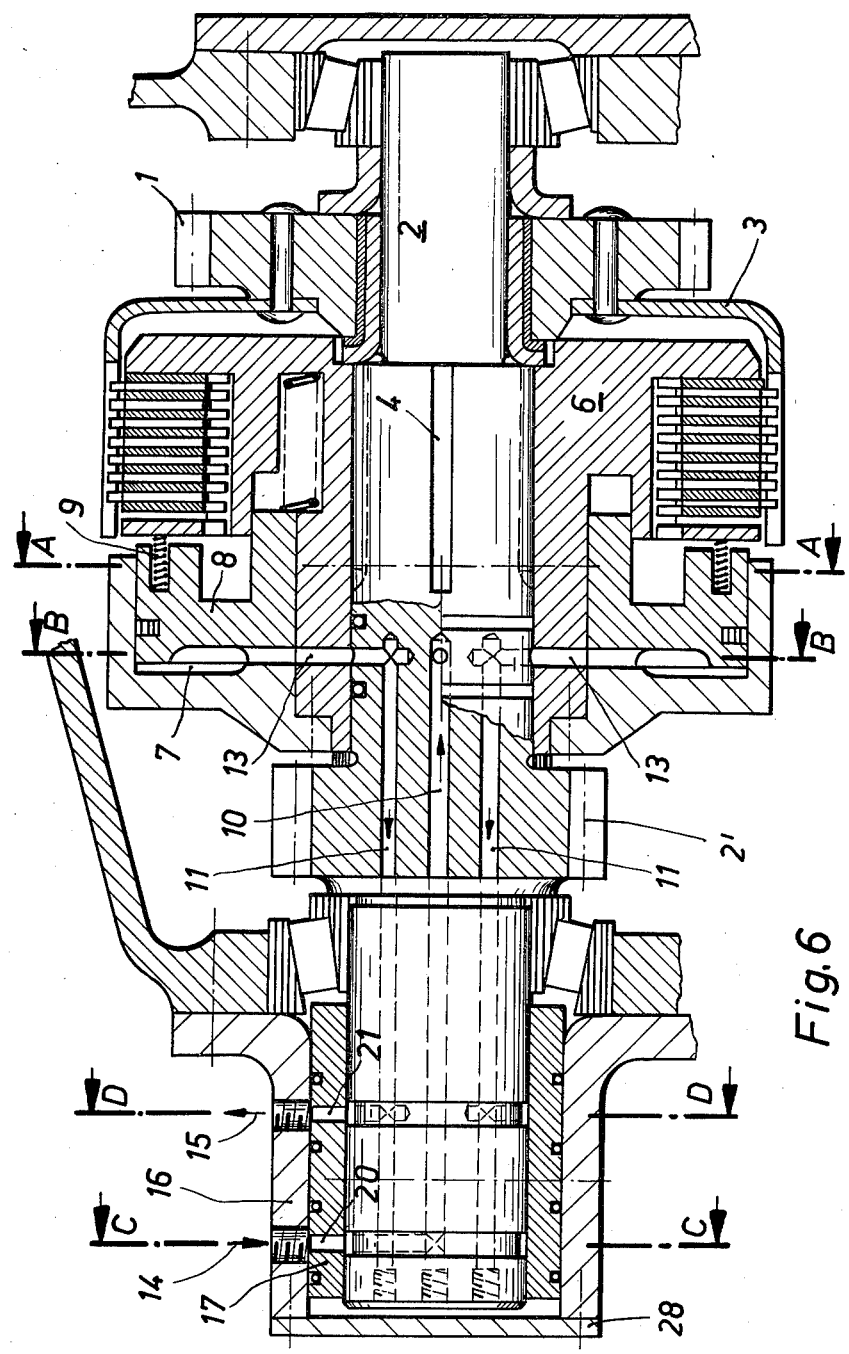
FIG. 6 shows a view in longitudinal section of a multi-plate friction clutch constructed in accordance with the invention, with associated control means, in the operative condition for 'forward travel' and 'clutch disengaged'.

The shaft 2 which, with the drive gear wheel 2', is made from one piece, has, as shown in FIG. 6, a key configuration 4 into which engage the wider splines 5, shown in FIGS. 7 and 8, of the inner plate carrier 6 which can rotate relative to the shaft 2 through the control angle $\alpha$. The pressure cylinder 7 is fixedly connected to the hub of the inner plate carrier 6, and encloses the piston 8 which is actuated by the pressure medium. The piston 8 is moved into the released position of the multi-plate clutch, that is to say, when the pressure oil feed is closed off and the discharge is open, as shown in FIGS. 2 and 4, in known manner, by compression springs, in opposition to any centrifugal force-residual oil pressure which may still persist. The shaft 2 is provided with separate bores 10 and 11 which serve as pressure medium lines for the feed and discharge of the pressure oil.

Figure 1:
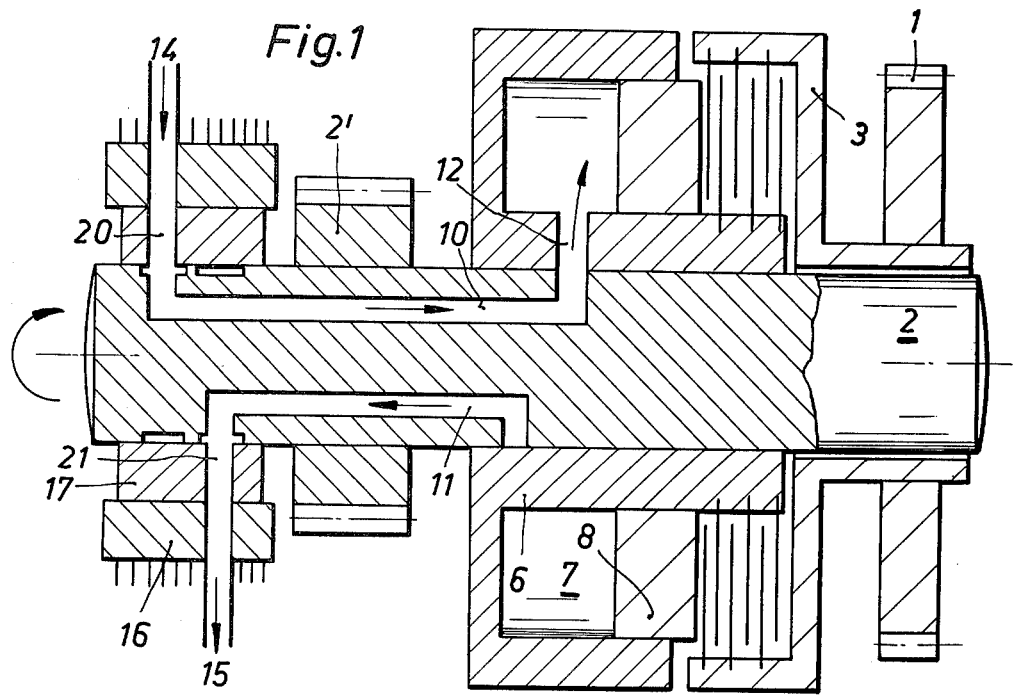
FIG. 1 shows the principle of the multi-plate friction plate according to the invention, with associated control means, in a direction of rotation indicated by an arrow, in the position for 'clutch engaged'.

In FIG. 1, the hub 6 of the inner plate carrier is applied with its spline against one edge of the key configuration of the shaft 2, as shown in FIG. 8, while in FIG. 2 the hub 6 lies against the other edge of the key configuration of the shaft 2, as shown also in FIG. 7.

In the positions of FIGS. 1 and 2, the sleeve 17 remains in its position which is produced by the one direction of rotation, in which the outer pressure feed line 14 is in communication with the pressure medium line 10 which extends in the shaft 2, and the outer pressure medium discharge line 15 is in communication with the pressure medium line 11 in the shaft 2.

The position of the multi-plate friction clutch diagrammatically shown in FIG. 2 corresponds to that of FIG. 6 which shows technical details of an embodiment.

In FIGS. 3 and 4, the multi-plate clutch is in the other direction of rotation indicated by the arrow and is shown with the sleeve 17 in the corresponding other position in which the sleeve interchanges, by means of the changeover control lines 30 and 31, the two pressure medium lines 10 and 11 in the shaft 2, in which position therefore the outer pressure medium feed line 14 is in communication with the pressure medium line 11 in the shaft 2, and the outer pressure discharge line 15 is in communication with the pressure medium line 10 in the shaft 2.

FIG. 3 shows the multi-plate clutch in the 'clutch engaged' position of the hub 6 of the inner plate carrier on the shaft 2, as a result of overtaking of the driving side, namely the outer plate carrier 3, relative to the driven side, namely the inner plate carrier 6, for example when there is substantial slip of the normally driven wheels which are at the front.

FIG. 4 shows the 'clutch disengaged' position of the hub 6 of the inner plate carrier on the shaft 2, as a result of overtaking of the driven slide, namely the outer plate carrier 3, for example when the wheels which are at the rear and which are not normally driven are in a leading condition.

In FIG. 3, the hub 6 of the inner plate carrier is applied by way of its spline against the outer edge of the key configuration of the shaft 2, while in FIG. 4 it is applied against the one edge of the key configuration of the shaft 2.

In order for the sleeve 17, which acts as the second rotary slide valve, to be rotatable only about the control angle $\beta$ defined by stops, and in order to provide for over-riding of the automatic freewheel property of the multi-plate clutch in both directions of rotation, by means of remote actuation, for example, pushbutton control, an electromagnetic ¾-way valve 33 may be advantageously flange-connected to the housing 16, for controlling the pressure medium, the valve 33 having the following three positions:

1. Through-flow for the pressure medium feed line (clutch continuously engaged);
2. Through-flow for pressure medium feed line and pressure medium discharge line (freewheel in both directions of rotation);
3. Through-flow only for pressure medium discharge line (clutch continuously disengaged).

As can be seen from FIG. 6, the pressure cylinder 7 which encloses the piston 8 which is actuated by the pressure medium, is fixedly connected to the hub of the inner plate carrier 6. The piston 8 is moved into the disengaged position of the multi-plate clutch, that is to say, when the pressure oil feed is closed and the discharge is opended, as shown in FIGS. 2, 7 and 9, in known manner, by compression springs against the centrifugal force-residual. In case, the friction of the steel plates which are formed in known manner as so-called sinusoidal plates should not be sufficient, in the released position of the clutch, to rotate the hub of the inner plate carrier 6 on the shaft 2 through the control angle $\alpha$, the clutch is provided with weak springs 9

(shown in FIG. 6) which apply a weak axial pressure to the pack of plates, in order to increase the residual moment in the piston 8. The shaft 2 is provided with separate pressure medium lines 10, 11 for the feed of pressure oil and for the discharge thereof.

FIG. 7 corresponds to the limit position in which the shaft 2 and the hub of the inner plate carrier 6 are disposed when the shaft 2 tries to overtake the hub of the inner plate carrier 6. Even in the clutch-disengaged position, there is a small amount of continuing friction between the inner plates and the outer plates.

FIG. 8 corresponds to the limit position in which the shaft 2 and the hub of the inner plate carrier 6 are disposed when the inner plate carrier 6 tries to overtake the shaft 2.

In the region in which the lines 10 and 11 extend radially outwardly, the coupling between the shaft 2 and the hub of the inner plate carrier 6 is of a cylindrical configuration and is advantageously sealed by O-rings (FIG. 6).

As can be seen from the view in section taken along line B—B in FIG. 6 through the shaft 2 and the hub of the inner plate carrier 6 in FIGS. 9 and 10, the hub of the inner plate carrier 6 is formed as a rotary slide valve, insofar as its feed ports 12 are displaced relative to its discharge ports 13 through the control angle $90° + \alpha$ or $90° - \alpha$ respectively.

FIG. 10 shows the position of the rotary slide valve corresponding to FIG. 8, for the plate clutch in a clutch engaged condition; the pressure medium line 10 in the shaft 2 is connected to the pressure medium line 12 in the hub 6 and the pressure medium line 11 is closed.

FIGS. 1 to 4 also show that the outer pressure oil feed line 14 and the outer pressure oil discharge line 15 are connected to the stationary transmission housing 16. Through this they are connected by a sleeve 17 which floats on the shaft 2, to the annular grooves in the shaft 2 for the pressure medium line 10 and the pressure medium lines 12, for forward movement of the vehicle, see the view in section taken along lines C—C and D—D in FIG. 6, shown in FIGS. 11 and 12.

In contrast to the known construction however the sleeve 17 is not non-rotatably connected to the fixed housing 16 but is arranged to be rotatably relative thereto through a given angle of rotation $\beta$, for example by the usual fixing screw member 18 engaging into a segmental groove 19 with two abutments in the sleeve 17, as can be seen from FIGS. 11 and 12.

In forward travel, the sleeve 17 is entrained by friction by the shaft 2 into the one position shown in FIGS. 11 and 12. FIG. 11 shows a view in section taken along line C—C, while FIG. 12 shows a view in section taken along line D—D, in FIG. 6. In this position of the second rotary slide valve, FIG. 11, the annular groove in the shaft 2, for the one pressure oil line 10, receives the pressure medium supplied from the outer pressure oil feed line 14 by way of the feed line port 20 in the sleeve 17, and at the same time the annular groove in the shaft 2 for the other pressure oil line 11, FIG. 12, communicates by way of the discharge port 21 in the sleeve 17 with the outer pressure oil discharge line 15 which unlike FIG. 6, is shown at the bottom in FIG. 12, for the sake of better comprehension of the diagrammatic illustration.

In rearward travel, the sleeve 17 is rotated through the control angle $\beta$ by friction by the shaft 2 into the other position shown in FIGS. 3 and 4. In this position of the second rotary slide valve, FIG. 11, the feed port 20 of the sleeve 17 is closed but the outer pressure medium feed line 14 is in communication by way of the line system 30, as can be seen from FIG. 12, with the annular groove in the shaft 2 for the other pressure oil line 11, and at the same time the discharge port 21 of the sleeve 17 is closed but the outer pressure medium discharge line 15 is in communication by way of the line system 31 with the annular groove in the shaft 2 of the one pressure medium line 10. The two pressure medium lines 10 and 11 are therefore interchanged with each other for reversing, in respect to their functions in forward travel.

The automatic freewheel action of the multiplate friction clutch according to the invention, in both directions of rotation or travel, by simply changing over the position of the feed sleeve without the application of force, without any other means being required, represents a considerable technical advance over the known one-way freewheel means which have mechanical locking means.

For the use envisaged, but also for other general uses, it may be necessary for the automatically operative freewheel action to be over-ridden manually, on the one hand in order to keep the freewheel continuously locked in a particular condition, for example when travelling on slippery ice on the carriageway, without being influenced by a difference in angular speed or by direction of rotation, and on the other hand in order to keep the multi-plate clutch continuously released, in a particular position, for example in transportation.

This problem is solved, as shown in FIG. 5, by a remotely actuated electromagnetic 3/4-way valve 33.

It is known that motor vehicles which have drive to all their wheels, when travelling on a solid carriageway which the wheels can grip, suffer from a stress which arises between the driven axles as a result of different rolling distances and rolling radii of their wheels, unless the vehicles are provided with a compensation transmission between the drive axles. As a result of this stress between the driven axles, forced slippage occurs between the wheels, with the result that the tyres suffer from a high rate of wear.

In order to avoid this condition, the drive for the wheels which are not driven normally must be cut out when it is not required, namely on a firm carriageway which the wheels can grip. The driver who is required to cut this drive in and out, frequently forgets to do this in good time.

The novel automatic clutch relieves the driver of the load of carrying out the operation of cutting the drive in and out, which is highly advantageous.

The construction of the clutch according to the invention ensures that both in vehicles with front-wheel drive and in vehicles with rear-wheel drive, and both in forward travel and in reverse travel, the clutch which connects the wheels that are driven continuously and the wheels that are not driven continuously always engages automatically when the gear wheel 1 which is driven proportionally to the speed of rotation of the continuously driven wheels tries to lead the shaft 2, by virtue of slippage of rotation of the shaft being in a suitable given transmission ratio relative to the speed of rotation of the wheels that are not driven continuously.

I claim:

1. A multi-plate friction clutch for motor vehicles operable by fluid pressure and having an inner plate carrier and an outer plate carrier, wherein the inner plate carrier has a hub swivel-mounted on a shaft between two positions through a control angle $\alpha$ to form a rotary slide valve such that in one position a pressure cylinder for applying pressure to the clutch plates is in communication with a source of fluid pressure through a feed line, and in the other position the pressure cylinder is in communication with a fluid discharge line and is cut off from the feed line, wherein the shaft has at least one radial bore connectable to the feed line and at least one other radial bore connectable to the discharge line, and wherein the inner plate carrier has at least two radial bores leading to the pressure cylinder, the bores in either the shaft or the inner plate carrier being spaced apart by 90° and the bores in the inner plate carrier or the shaft being correspondingly spaced apart by $90° \pm \alpha$, a sleeve on the shaft rotatable with respect to a stationary housing of the clutch through a second control angle $\beta$, the sleeve forming a second rotary slide valve such that, in one direction of rotation in the shaft the feed line communicates through the sleeve with a duct in the shaft leading to said one of the radial bores and the discharge line communicates through the sleeve with another duct in the shaft leading to said one other of the radial bores, and in the other direction of rotation by the shaft the feed lines communicate through the sleeve with said one other of the radial bores through its duct and the discharge line communicates through the sleeve with the said one of the radial bores through its duct.

2. A clutch according to claim 1 having an outer plate carrier connectable to normally driven vehicle wheels, and wherein the inner plate carrier is connectable to vehicle wheels which are not normally driven whereby when the inner plate carrier is in the said one position, the normally driven wheels may be drivably connected to the wheels which are not normally driven.

3. A clutch according to claim 1 wherein the inner plate carrier is drivably connected to the shaft in which it is mounted by at least one key way and a key, the key way subtending an angle which is greater than the angle subtended by the key, whereby the inner plate carrier may move relative to the shaft through the angle $\alpha$.

4. A clutch according to claim 1 wherein the sleeve includes separate ports and line systems angularly separated by the angle $\beta$ whereby in the first direction of rotation of the shaft one of the ports connects the feed line with the said one of the radial bores and one of the line systems connects the discharge line with the said one other of the radial bores, and in the other direction of rotation the other port connects the discharge line with the said one of the radial bores and the other line system connects the feed line with the said one other of the radial bores.

5. A clutch according to claim 1 including auxiliary control means having an inoperative position and two operative positions, in one of which the pressure cylinder is connected to the feed line and not to the discharge line and in the other of which the pressure cylinder is connected to the discharge line and not to the feed line independently of the positions of the rotary slide valves.

6. A clutch according to claim 5 wherein the auxiliary control means is a ¾-way valve mounted on the clutch housing.

7. A clutch according to claim 1 wherein the sleeve is provided with locking means for releasably holding it in either of the two positions.

8. A clutch according to claim 1 wherein each radial bore is duplicated by a corresponding bore at 180° thereto.

9. A multi-plate free-wheel clutch operable by fluid pressure for motor vehicles with optional all-wheel-drive for automatic change from all-wheel-drive to one-axle-drive and vice versa, a ratio of transmission of one axle relative to the other axle being so chosen that a driving side of said clutch in disconnected position is synchronously running with a driven side of said clutch when the wheels of one driven axle have a substantial slip on the road, comprising means which when the slip exceeds a given value engage the clutch to achieve all-wheel-drive and which when the slip falls below that value disconnect said clutch to achieve one-axle-drive, wherein an inner plate carrier has a hub rotatable on a shaft between first and second positions through a control angle ($\alpha$) to form a rotary slide valve to control pressure for the clutch, the means comprising a pressure cylinder of said clutch which in the first position of the hub of the inner plate carrier is connected with a first pressure medium line in the shaft and is disconnected from a second pressure medium line in the shaft but in the second position of the hub the inner plate carrier is connected with the second pressure medium line in the shaft and is disconnected from the first pressure medium line in the shaft, said clutch including a sleeve on the shaft rotatable with respect to a stationary housing of the clutch through a second control angle B, the sleeve forming a second rotary slide valve such that, in one direction of rotation a feed line communicates through the sleeve with a first duct in the shaft and a discharge line communicates through the sleeve with a second duct in the shaft, and in the other direction of rotation the feed line communicates through the sleeve with the second duct and the discharge line communicates through the sleeve with the first duct.

10. A clutch according to claim 9 wherein the sleeve is provided with locking means for releasably holding the sleeve in either of the two directions of rotation.

11. A clutch according to claim 9 wherein the inner plate carrier is drivably connected to the shaft on which it is mounted by at least one keyway and a key, the keyway subtending an angle which is greater than an angle subtended by the key, whereby the inner plate carrier may move relative to the shaft through the angle $\alpha$.

12. A clutch according to claim 9 wherein the shaft has at least one radial bore connectable to the feed line and at least one other radial bore connectable to the discharge line, and wherein the inner plate carrier has at least two radial bores leading to the pressure cylinder, wherein in one direction of rotation in the shaft the feed line communicates through the sleeve with a duct in the shaft leading to said one of the radial bores and the discharge line communicates through the sleeve with another duct in the shaft leading to said one other of the radial bores, and in the other direction of rotation by the shaft the feed lines communicates through the sleeve with said one other of the radial bores through its duct and the discharge line communicates through the sleeve with the said one of the radial bores through its duct.

13. A clutch according to claim 12 wherein the bores in either the shaft or the inner plate carrier are spaced apart by 90° and the bores in the inner plate carrier or the shaft are correspondingly spaced apart by $90° \pm \alpha$.

14. A multi-plate free-wheel friction clutch operable by fluid pressure for motor vehicles with optional all-wheel-drive for automatic change from all-wheel-drive to one-axle-drive and vice versa, a ratio of transmission of one axle relative to the other axle being so chosen that a driving side of said clutch in disconnected position is synchronously running with a driven side of said clutch when the wheels of one driven axle have a substantial slip on the road, comprising means which, when the slip exceeds a given value, engage the clutch to achieve all-wheel-drive and which, when the slip falls below that value disconnects said clutch to achieve one-axle-drive, wherein an inner plate carrier has a hub rotatable on a shaft between two positions through a control angle $\alpha$ to form a rotary slide valve to control pressure for the clutch, the means comprising a pressure cylinder of said clutch which in one position of the hub of the inner plate carrier is connected with a first pressure medium line in the shaft, including auxiliary control means having an inoperative position and two operative positions, in one of which operative positions the pressure cylinder is connected to a feed line and not to a discharge line and in the other of which operative positions the pressure cylinder is connected to the discharge line and not to the feed line independently of the positions of the rotary slide valves.

15. A clutch according to claim 14 wherein the auxiliary control means is a 3/4-way valve mounted on a housing of the clutch.

* * * * *